United States Patent
Kloesel

(10) Patent No.: US 9,494,044 B1
(45) Date of Patent: Nov. 15, 2016

(54) TURBO-ELECTRIC COMPRESSOR/GENERATOR USING HALBACH ARRAYS

(71) Applicant: The United States of America as Represented by the Administrator of NASA, Washington, DC (US)

(72) Inventor: Kurt J Kloesel, Wrightwood, CA (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 339 days.

(21) Appl. No.: 14/243,576

(22) Filed: Apr. 2, 2014

(51) Int. Cl.
*F02C 7/00* (2006.01)
*H02K 21/12* (2006.01)
*F01D 15/10* (2006.01)
*F02C 7/36* (2006.01)

(52) U.S. Cl.
CPC ............... *F01D 15/10* (2013.01); *F02C 7/36* (2013.01); *F05D 2220/323* (2013.01)

(58) Field of Classification Search
CPC ..... F01D 15/10; F02C 7/36; F05D 2220/323
USPC ............................................... 290/54, 43, 52
See application file for complete search history.

(56) References Cited

U.S. PATENT DOCUMENTS

| | | | | |
|---|---|---|---|---|
| 2,276,695 A * | 3/1942 | Lavarello | ................ | F01D 1/26 415/65 |
| 3,832,087 A * | 8/1974 | Lohonen | ................ | F01D 15/04 415/134 |
| 4,253,031 A * | 2/1981 | Frister | ................ | F01D 15/10 290/52 |
| 4,720,640 A * | 1/1988 | Anderson | ................ | F03B 13/083 290/43 |
| 4,781,522 A * | 11/1988 | Wolfram | ................ | F03D 1/025 415/1 |
| 5,083,040 A * | 1/1992 | Whitford | ................ | F01D 15/10 290/52 |
| 5,285,123 A * | 2/1994 | Kataoka | ................ | F01D 15/10 290/52 |
| 5,705,902 A * | 1/1998 | Merritt | ................ | H02K 1/2786 310/156.43 |
| 6,353,790 B1 * | 3/2002 | Tsuzuki | ................ | F02C 9/263 60/204 |
| 6,906,446 B2 | 6/2005 | Post | | |
| 7,586,217 B1 | 9/2009 | Smith et al. | | |
| 7,952,244 B2 * | 5/2011 | Colin | ................ | F01D 15/10 290/52 |
| 8,446,121 B1 | 5/2013 | Parsa et al. | | |
| 8,803,354 B2 * | 8/2014 | Wamble, III | ................ | B60L 13/04 290/44 |
| 2007/0029803 A1 * | 2/2007 | Randall | ................ | F01D 15/10 290/52 |
| 2013/0078123 A1 | 3/2013 | Fukasaku et al. | | |

* cited by examiner

Primary Examiner — Julio Cesar Gonzalez Ramirez
(74) Attorney, Agent, or Firm — Mark Homer

(57) ABSTRACT

The present invention is a turbojet design that integrates power generation into the turbojet itself, rather than use separate generators attached to the turbojet for power generation. By integrating the power generation within the jet engine, the weight of the overall system is significantly reduced, increasing system efficiency. Also, by integrating the power generating elements of the system within the air flow of the jet engine, the present invention can use the heat generated by the power generating elements (which is simply expelled waste heat in current designs) to increase the engine performance.

5 Claims, 5 Drawing Sheets

Turbo-Electric Compressor Generator placed behind fan section of turbofan

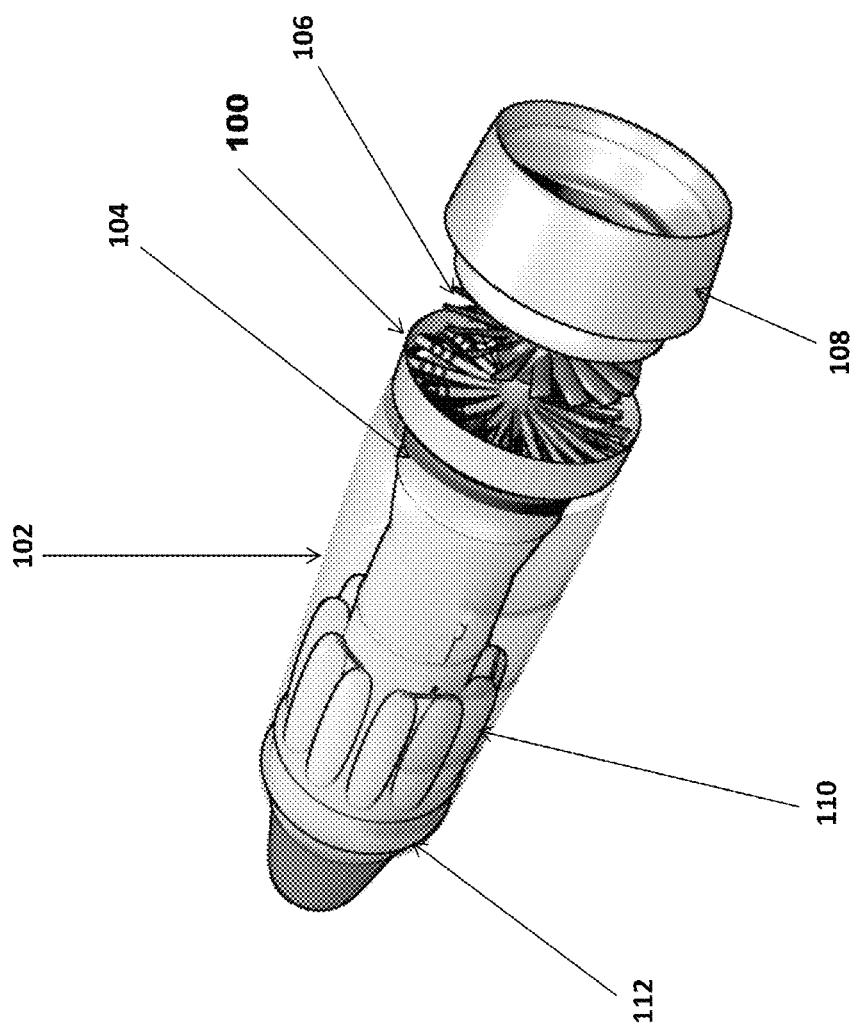
Figure 1. Turbo-Electric Compressor Generator placed behind fan section of turbofan

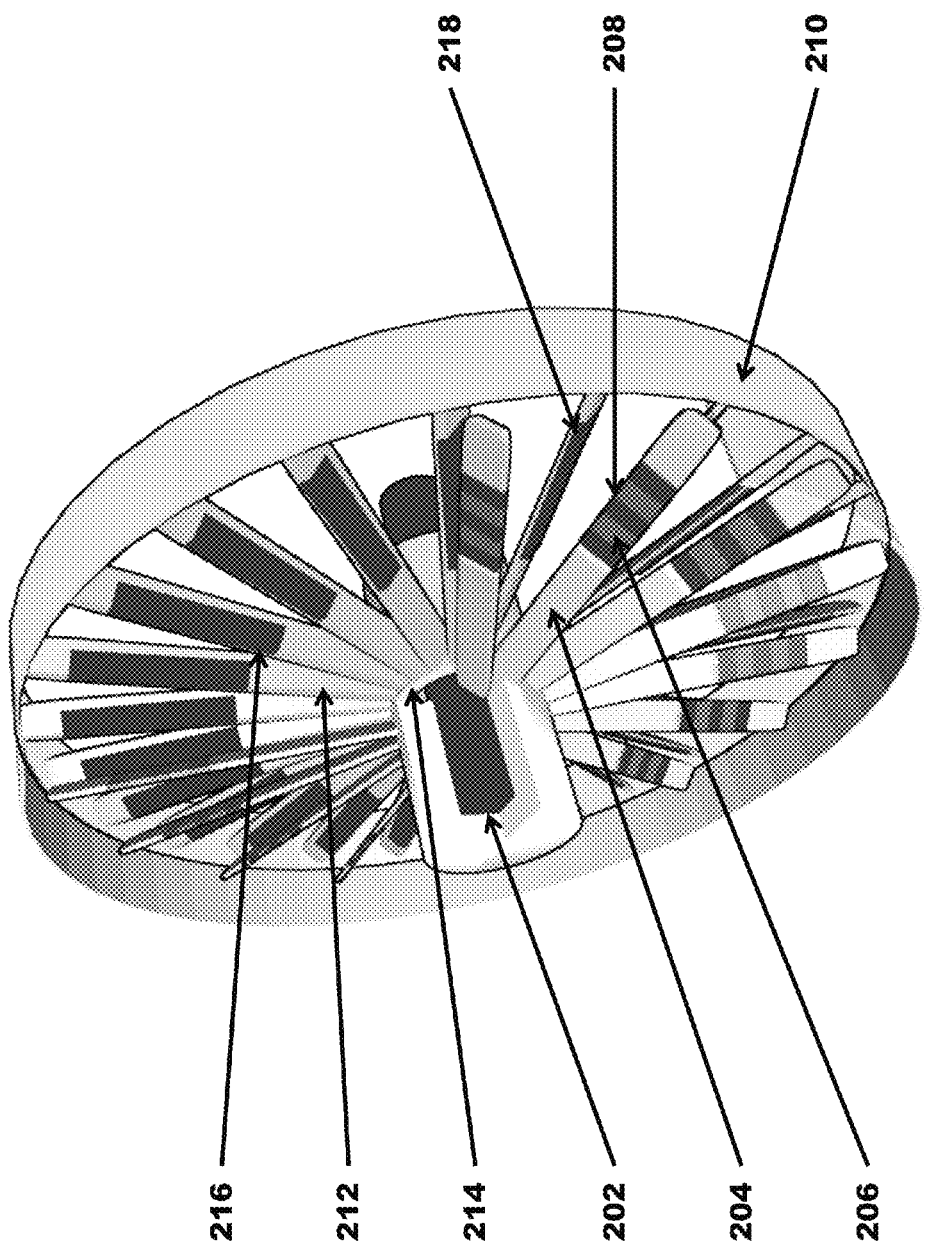
Figure 2a. Cut-away showing power generation elements

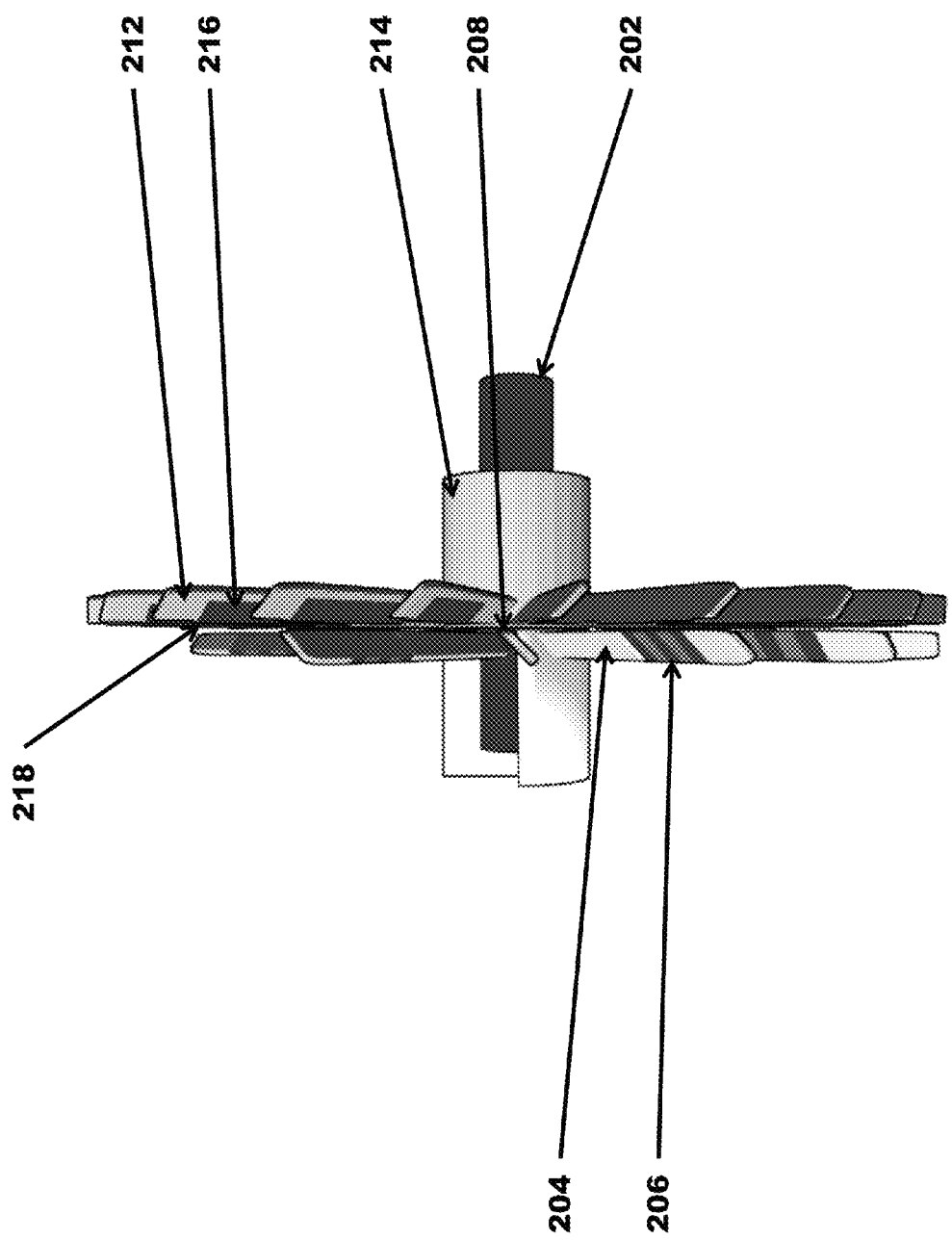
Figure 2b. Side view showing power generation elements

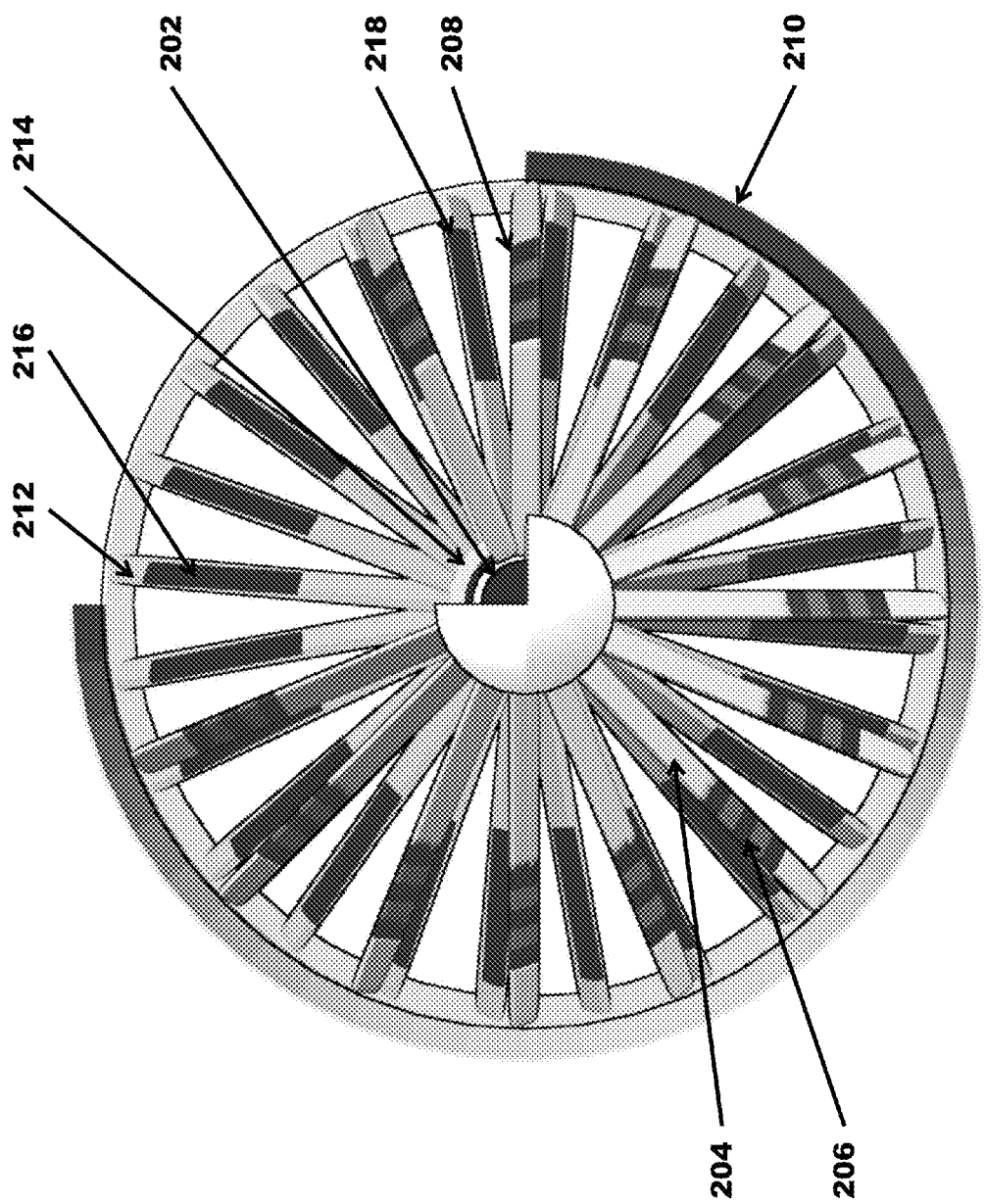
Figure 2c. Top view showing power generation elements

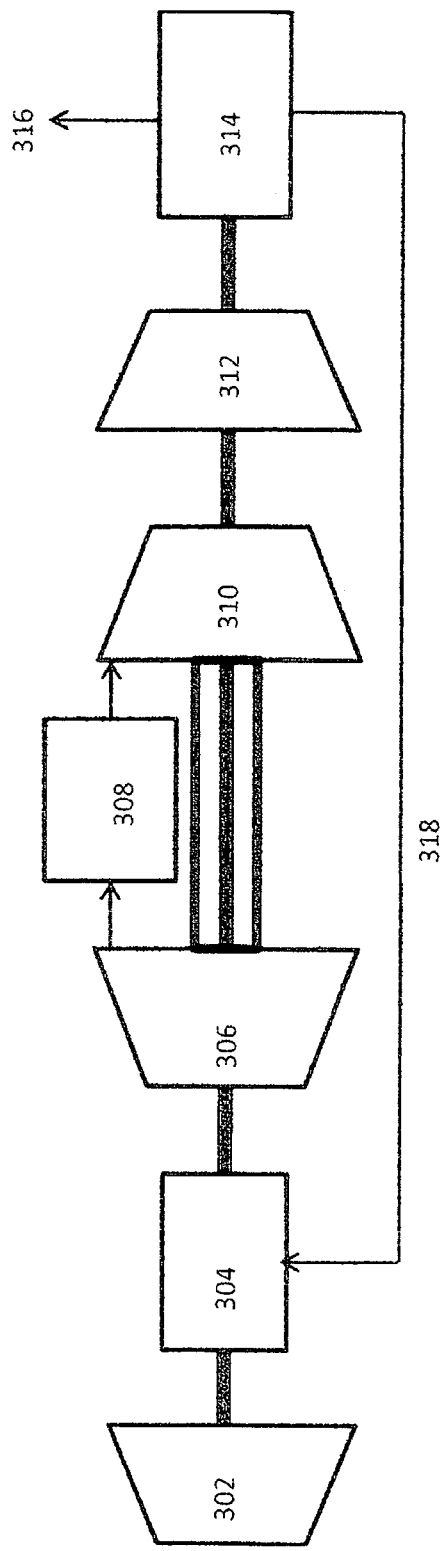
Figure 3. Axial Flux Axial Flow Thermodynamic Regenerative Cycle

TURBO-ELECTRIC COMPRESSOR/GENERATOR USING HALBACH ARRAYS

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the Invention

The present invention relates generally to electric generation and more specifically to electric generation for a turbo-electric compressor (such as is used in a turbojet).

2. Description of the Related Art

In general, the current approach for the design of a turbojet is to provide side mounted generators that require a ninety degree gearbox configuration. The problems associated with such a design is that this requires the weight of a gearbox and the direct connection of power generators result in a constriction of the flow path, which generates significant heat to the system.

To attempt to improve this design, previous patents have addressed increasing the power density of the system by creating dual functions of rotating machinery and tightening system integration (see U.S. Pat. No. 6,832,486 and U.S. patent application 2008/0265580); however, these designs neglect the heat issues mentioned above, which are inherent in a radial flux design.

While recent small motor designs have been developed that employ an axial flux arrangement, none of these has included the capability of combining a compressor and motor unit that would be essential for power generation for a turbo-electric compressor.

Therefore, it is desired to provide an integrated turbo-electric compressor that provides power generation for a turbojet type of propulsion system that is lighter weight than current designs and increases thermodynamic efficiency.

SUMMARY OF THE INVENTION

The invention proposed herein comprises a combination compressor, generator, motor system for a turbojet that improves performance over present systems.

Accordingly, it is an objective of this invention to provide a combination compressor, generator, motor system for a turbojet that decreases the weight of the system.

It is another objective to provide a combination compressor, generator, motor system for a turbojet that reuses waste heat produced by power generation.

This invention meets these and other objectives related to electric generation for a turbo compressor by providing an axial flow compressor, generator, motor system comprising a rotatable shaft within a stationary, circular outer rim surrounding the shaft. A plurality of compressor rotor blades attached around the shaft, making them rotatable within the outer rim. Each of the compressor rotor blades has at least one permanent magnet Halbach array arranged thereon so that an electro-magnetic flux is present and directed to one side of the rotor blades. A plurality of stator blades are attached on one end to the outer rim and adjacent to the side of the rotor blades where the electro-magnetic flux is directed. Each of the stator blades has a plurality of electro-magnetic conductive media arranged on them. A sleeve surrounds a portion of the shaft, directly under the stator blades, with each of the stator blades connected thereto, allowing the shaft to rotate, so that the rotor blades rotate while the shaft rotates, but keeping the stator blades stationary. When the shaft and rotor blades rotate relative to the stationary stator blades, the present electro-magnetic flux moves across the stator blade electro-magnetic conductive media, creating a current.

The present invention also provides a method for power generation for a jet engine.

BRIEF DESCRIPTION OF THE DRAWINGS

In the drawings, which are not necessarily to scale, like or corresponding parts are denoted by like or corresponding reference numerals.

FIG. 1 depicts a one embodiment of the present invention associated with a turbojet.

FIG. 2a depicts an angled cut-away view of the power generation elements of the embodiment of the invention shown in FIG. 1.

FIG. 2b depicts a side cut-away view of the power generation elements of the embodiment of the invention shown in FIG. 1.

FIG. 2c depicts a top cut-away view of the power generation elements of the embodiment of the invention shown in FIG. 1.

FIG. 3 depicts the thermodynamic regenerative cycle of the present invention.

DESCRIPTION OF PREFERRED EMBODIMENTS

The present invention is a turbojet design that integrates power generation into the turbojet itself, rather than use separate generators attached to the turbojet for power generation. By integrating the power generation within the jet engine, the weight of the overall system is significantly reduced, increasing system efficiency. Also, by integrating the power generating elements of the system within the air flow of the jet engine, the present invention can use the heat generated by the power generating elements (which is simply expelled waste heat in current designs) to increase the engine performance.

It is to be understood by those skilled in the art that the power generation elements described herein are to be integrated directly with a jet engine or the like to replace the separate generators that are normally employed when using a jet engine. The power generation elements of the present invention are meant to be inserted into the air flow of the jet engine, either in front of the engine (by adjusting the power generation elements to work with the variable inlet guide vanes of the outer spool (fan) of the jet engine) or, preferably, by inserting the elements between the outer spool (fan) and the inner spool (compressor) of the jet engine. In either configuration, the power generation elements of the present invention are designed to provide for axial air flow there through, as part of the jet engine itself.

In general, the present invention is an axial air flow compressor, generator, motor system that is incorporated into and provides power for a jet engine. Referring to FIGS. 1 and 2a-c, the present invention comprises an axial flow power generation elements 100 integrated with a standard jet engine (such as a turbojet or similar), including, for example, a bypass air duct and shroud, 102, a high pressure compressor, 104, a fan section 106, a fan shroud, 108, a burner section, 110, and a turbine section 112. The axial power generation elements 100 comprise a rotatable shaft 202 (which would be the overarching shaft used within the jet engine itself) which has one end of a plurality of compressor rotor blades 204 attached thereto. The other end of the rotor blades 204 are free from attachment so that when the shaft 202 rotates, the rotor blades 204 freely rotate as well. In a preferred embodiment, about twenty rotor blades 204 are arranged around the shaft 204. It is also preferred that the rotor blades 204 are thin enough to allow air to flow readily between them while rotating and that the rotor blades are made of a titanium alloy.

Each rotor blade has at least one permanent magnet Halbach array 206 configured thereon so that the present electro-magnetic flux caused by the array is directed to one side 208 of the rotor blades 204. In a preferred embodiment, the permanent magnet Halbach arrays 206 comprise neodymium-iron-boron or samarium-cobalt.

A circular outer rim 210 surrounds the shaft 202 and rotor blades 204 so that the rotor blades 204 may rotate freely as the shaft 202 rotates. It will be understood by those skilled in the art that the circular outer rim 210 is part of the overall outer casing of the jet engine (either attached to the front of the engine casing or part of the casing if the elements discussed herein are incorporated between existing portions of the engine). The circular outer rim 210 preferably will be made of a titanium alloy (as will other support structures associated with the present invention as described herein).

A plurality of stator blades 212 are affixed on one end to the outer rim 210 and on the other end to a sleeve 214 surrounding a portion of the shaft 202. The sleeve 214 is adjacent to the attachment point of the rotor blades 204 to the shaft 202 so that the stator blades 212 are adjacent to the rotor blades 204. As the stator blades 212 are attached at both ends, they are stationary during operation of the system. The sleeve 214 is hollow and is suspended around the shaft 202 without contacting the shaft 202 so that the shaft 202 may rotate freely. Preferably, the number of stator blades 212 is the same as the number of rotor blades 204.

A plurality of electro-magnetic conductive media 216 are embedded along the stator blades 212 on the side 218 closest to the side 208 of the rotor blades 204. The electro-magnetic conductive media 216 comprises a material that can accept and transfer the electro-magnetic flux created by the rotation of the rotor blades 204 in relation to the stationary stator blades 212, thereby generating a current used by the jet engine for power. In a preferred embodiment, the electro-magnetic conductive media 216 comprises enameled copper coils or bars or Litz wire with a ferromagnetic core and are arranged lengthwise down the blade of the stator blades 212 with silicon steel backing.

In operation, air would flow from the rotator blade 204 side of the system through the stator blade 212 side of the system. The shaft 202 would rotate, causing the rotor blades 204 to rotate. As an electro-magnetic flux would be present on one side of the rotating rotor blades 204, the electro-magnetic flux would be transferred to the electro-magnetic conductive media 216 on the stator blades 212. In turn, this would generate an electric current which could provide power to a jet engine.

Referring to FIG. 3, the thermodynamic aspects of a conventional turbo-generator are compared to those of the present invention. The elements of the flow chart are as follows: 302 is the LPC (low pressure compressor), 304 is the AFAF (axial flux, axial flow) regen in, 306 is the HPC high pressure compressor, 308 is the heat in from the burner, 310 is the HPT (high pressure turbine), 312 is the LPT (low pressure turbine), 314 is the electrical generator, 316 is the electrical power generated, and 318 is the heat generated. While the actual physical shaft location of the AFAF generator is before the HPC, the arrangement shown in the flowchart is simply to demonstrate the thermodynamic regeneration cycle. As can be seen, in a conventional turbo-generator, the heat generated by the system is merely expelled as waste heat. This both creates a cooling issue and wastes energy. In the present invention, the heat generated by the system is regenerated and used as energy into the system due to the fact that the present invention is integrated into the jet engine itself and accepts and expels air flow (unlike the power elements of a conventional turbo-generator system). As such, the present invention is more efficient than a conventional turbo-generator.

What is described herein are specific examples of many possible variations on the same invention and are not intended in a limiting sense. The claimed invention can be practiced using other variations not specifically described above.

What is claimed is:

1. A jet engine system, comprising:
   a fan section, having a fan shroud covering the fan section;
   a power generation system adjacent to the fan section, comprising:
      a rotatable shaft;
      a stationary, circular outer rim surrounding the shaft;
      a plurality of compressor rotor blades attached around the shaft, rotatable within the outer rim as the shaft rotates, comprising:
         at least one permanent magnet Halbach array arranged on each rotor blade wherein an electro-magnetic flux is present and directed to a first side of the rotor blades;
      a plurality of stator blades having top sides attached to the outer rim and adjacent to the first side of the rotor blades, comprising a plurality of electro-magnetic conductive media arranged thereon;
      a sleeve surrounding a portion of the shaft, adjacent to the first side of the rotor blades wherein a bottom side of the stator blades are connected thereto so that the shaft is rotatable within the sleeve and the stator blades are stationary;
      wherein rotation of the shaft and rotor blades relative to the stationary stator blades creates an electro-magnetic flux in the stator blade electro-magnetic conductive media, generating current;
   a high pressure compressor adjacent to the power generation system;
   a bypass air duct adjacent to the high pressure compressor having a bypass shroud covering the bypass air duct;
   a burner section adjacent to the bypass air duct; and,
   a turbine section adjacent to the burner section.

2. The jet engine system of claim 1, wherein the plurality of compressor rotor blades comprises twenty and the plurality of stator blades comprises twenty.

3. The jet engine system of claim 1, wherein the permanent magnet Halbach array comprises a material selected from neodymium-iron-boron or samarium-cobalt.

4. The jet engine system of claim 1, wherein the electro-magnetic conductive media is selected from enameled copper coils, enameled copper bars, or Litz wire.

5. The jet engine system of claim 1, wherein heat generated by the system operation is regenerated into the system.

* * * * *